(12) United States Patent
Nakahama et al.

(10) Patent No.: US 9,958,205 B2
(45) Date of Patent: May 1, 2018

(54) DRYING APPARATUS

(71) Applicant: SEIBU GIKEN CO., LTD., Fukuoka (JP)

(72) Inventors: Nobutaka Nakahama, Fukuoka (JP); Keimei Furuki, Fukuoka (JP)

(73) Assignee: SEIBU GIKEN CO., LTD., Fukuoka (JP)

( * ) Notice: Subject to any disclaimer, the term of this patent is extended or adjusted under 35 U.S.C. 154(b) by 0 days. days.

(21) Appl. No.: 15/358,623

(22) Filed: Nov. 22, 2016

(65) Prior Publication Data

US 2017/0146293 A1    May 25, 2017

(30) Foreign Application Priority Data

Nov. 24, 2015    (JP) .................. 2015-228321

(51) Int. Cl.
| | |
|---|---|
| *F26B 25/00* | (2006.01) |
| *B01D 53/00* | (2006.01) |
| *B01D 53/06* | (2006.01) |
| *F26B 21/02* | (2006.01) |

(52) U.S. Cl.
CPC .......... *F26B 25/006* (2013.01); *B01D 53/002* (2013.01); *B01D 53/06* (2013.01); *F26B 21/02* (2013.01); *B01D 2253/102* (2013.01); *B01D 2253/108* (2013.01); *B01D 2257/708* (2013.01); *B01D 2258/06* (2013.01); *B01D 2259/4009* (2013.01)

(58) Field of Classification Search
CPC ...... F26B 25/006; F26B 21/12; B01D 53/002; B01D 53/06; B01D 2253/102; B01D 2253/108; B01D 2257/708; B01D 2258/06; B01D 2259/4009
USPC .................................... 34/74, 78; 118/412
See application file for complete search history.

(56) References Cited

U.S. PATENT DOCUMENTS

| | | | | |
|---|---|---|---|---|
| 3,991,481 | A | * | 11/1976 | Coraor .................. F26B 21/14 34/449 |
| 4,106,209 | A | * | 8/1978 | Brown .................. F26B 21/14 34/339 |
| 4,841,645 | A | * | 6/1989 | Bettcher .............. F26B 21/145 34/470 |

(Continued)

FOREIGN PATENT DOCUMENTS

| | | | | |
|---|---|---|---|---|
| CA | 2548613 A1 | * | 9/2005 | .......... B01J 20/3441 |
| EP | 2620465 A1 | * | 7/2013 | .............. B29B 9/16 |

(Continued)

*Primary Examiner* — Stephen M Gravini
(74) *Attorney, Agent, or Firm* — Staas & Halsey LLP

(57) ABSTRACT

Exhaust air from a coater drier is sent to a desorption zone of a VOC concentration rotor. Air which comes out of the desorption zone is sent to a heat exchanger and cooled, the cooled air which comes out of the heat exchanger is sent to a cooling coil which carries out VOC concentration recovery. Air which comes out of the cooling coil is sent to an absorption zone of the VOC concentration rotor. Air which comes out of the absorption zone is sent to the heat exchanger and heated. The heated air which comes out of the heat exchanger is sent to a heating coil to be used as supply air for a coater drier. A heat pump can be used for the cooling coil which carries out cooling condensation of the organic solvent and the heating coil which heats purified air as air supply for the coater drier.

16 Claims, 4 Drawing Sheets

(56) References Cited

U.S. PATENT DOCUMENTS

| | | | | |
|---|---|---|---|---|
| 7,717,057 B2 * | 5/2010 | Hutchinson | ............... | B05D 1/18 |
| | | | | 118/313 |
| 8,196,312 B2 * | 6/2012 | Taguchi | ................ | B41C 1/1083 |
| | | | | 118/65 |
| 8,763,272 B2 * | 7/2014 | Maynard | ................. | F26B 5/048 |
| | | | | 34/337 |
| 8,793,895 B2 * | 8/2014 | Gasteyer, III | ............. | F26B 5/06 |
| | | | | 34/287 |
| 9,080,961 B2 * | 7/2015 | Adachi | ................... | B29B 13/08 |
| 9,250,013 B2 * | 2/2016 | Kemper | ................. | F26B 17/005 |
| 2007/0075449 A1 * | 4/2007 | Nagashima | ............. | B29C 41/28 |
| | | | | 264/1.6 |
| 2009/0018668 A1 * | 1/2009 | Galbraith | ............. | B01J 20/3441 |
| | | | | 623/23.65 |
| 2010/0058609 A1 * | 3/2010 | Taguchi | ................ | B41C 1/1083 |
| | | | | 34/443 |
| 2011/0157524 A1 * | 6/2011 | Kawanishi | ............. | B29C 41/28 |
| | | | | 349/96 |
| 2017/0146293 A1 * | 5/2017 | Nakahama | ............. | F26B 21/02 |

FOREIGN PATENT DOCUMENTS

| | | | | |
|---|---|---|---|---|
| EP | 2620465 B1 * | 9/2014 | ............... | B29B 9/16 |
| JP | 2004-230265 | 8/2004 | | |
| JP | 2012-139657 | 7/2012 | | |
| JP | 2012-172960 | 9/2012 | | |
| WO | WO 2005081722 A3 * | 1/2006 | .......... | B01J 20/3441 |
| WO | WO 2013110414 A1 * | 8/2013 | ............... | B29B 9/16 |

* cited by examiner

DRYING APPARATUS

CROSS-REFERENCE TO RELATED APPLICATIONS

This application is based upon and claims the benefit of priority from the prior Japanese Patent Application No. 2015-228321 filed on Nov. 24, 2015, the entire contents of which are incorporated herein by reference.

BACKGROUND

1. Field

The present invention relates to a drying apparatus, one example of which is used in a coater drier which dries the material coated by a thin film, etc. with a coating machine, etc.

2. Description of the Related Art

Patent document 1 Japanese Patent Laid-Open Publication 2012-172960

Patent document 2 Japanese Patent Laid-Open Publication 2012-139657

Patent document 3 Japanese Patent Laid-Open Publication 2004-230265

The technology disclosed in patent document 1 is to spray hot gases at about Centigrade 50-300° C. (let all temperature be "Centigrade" henceforth) on a substrate surface processed by painting. In this case, it is necessary to install the hot gas generating furnace provided with a heater etc., and an energy expenditure at the time of operation of the furnace becomes large.

The technology disclosed in patent document 2 is to carrying out by a cooling coil concentration recovery of exhaust air from a drier, which contains a high-concentration N-Methyl-2-pyrrolidone (NMP) solvent, to return the high-concentration system exhaust air from the drier to an inlet side of the drier and to carry out condensation recovery of a part of gas by passing the part of the gas through an adsorption rotor. A part of air which passed through a treatment area of the adsorption rotor is returned to an outlet side of the drier as low-concentration system drier exhaust air.

However, the technology disclosed in patent document 2 has a problem that, since the exhaust air including a high-concentrated NMP is returned to the inlet side where the NMP generating concentration is comparatively high, the dry efficiency of NMP falls. Also, since a part or the whole quantity of gas which comes out of the treatment area of the adsorption rotor is exhausted to outdoors, an energy loss is generated.

The technology disclosed in patent document 3 is that the humidity of purification gas is very high since water is used for processing of exhaust gas. An installation of a dehumidifier etc., is needed to reduce humidity in order to reuse the gas as air for dryness. Accordingly, the disclosed technology requires an initial cost and a high running cost. Also, as to the technology, a lot of water is needed and a rate of solvent recovery becomes comparatively low with about 80%. Further, it is necessary to process the water containing solvent, and sanitation facilities for water are needed.

SUMMARY

In view of this actual condition, the present inventors propose to provide a coater drier which desorbs VOC (an example "NMP") absorbed by the VOC concentration rotor by using exhaust heat of the coater drier, reduces energies by carrying out condensation recovery of the VOC condensed with a cooler, and thereby reduces energies of hot wind generator for dryness by utilizing thermal energy after desorption of the VOC concentration rotor and heat from a capacitor, which is exhausted in the frozen cycle of the cooler. Also, the proposed coater drier (drying apparatus) can recover about 99% of VOC recovery concentration and can reduce the VOC recovery cost by waste fluid generation. Since concentration recovery can be carried out below in original gas temperature, the prevention from denaturation of VOC also becomes possible and becomes recyclable of the collected VOC.

Additional aspects and/or advantages will be set forth in part in the description which follows and, in part, will be apparent from the description, or may be learned by practice of the proposed system.

The present inventors propose that exhaust air from a coater drier is made to pass through a desorption zone of a VOC concentration rotor. The air which comes out of this desorption zone is made to pass through a cooling zone of a sensible heat exchanger to cool the air. The air which comes out from the cooling zone of this sensible heat exchanger is passed to a cooling device which carries out VOC condensation recovery. The air which comes out of this cooling device is made to pass through an adsorption zone of a VOC concentration rotor. The air which comes out of the absorption zone is made to pass through a heating zone of the sensible heat exchanger to heat the air. The air which comes out of the heating zone of the sensible heat exchanger is made to pass through a heating device. The air which comes out of this heating device is used for air supply for dryness of the coater drier. Also, an evaporator of heat pump is used as a cooling device (cooler), and a condenser of heat pump is used as a heating device (heater)

As to the coater drier, exhaust air from the drier as a device can be eliminated as much as possible, thermal energies of exhaust air by dryness can be collected by the sensible heat exchanger, air of low temperature with low NMP concentration after VOC concentration purification can be heated by the sensible heat exchanger, and it becomes energy saving. Since a hot wind generating furnace is not needed for the coater drier or the coater drier is provided in few heating load, reduction of initial cost, space saving and energy saving can be attained.

As to the above-stated coater drier, VOC absorbed by the VOC concentration rotor using exhaust heat of the coater drier can be desorbed, can collect heat of exhaust air from the drier by a sensible heat exchanger. Since a heat pump is used for the cooling device for condensation recovery of VOC and a heating device for generating hot wind which is reused for air supply of the coater drier, both control of initial cost by miniaturization as a device and control of running cost by energy saving under operation can be attained.

Also, since VOC concentration before VOC condensation recovery is made high using the VOC concentration rotor, recovery of about 99% of VOC recovery concentration can be performed, and reduction of waste fluid generation cost can be attained. Further, since VOC concentration recovery below original gas temperature can be performed, the denaturation of VOC by high temperature can be prevented.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
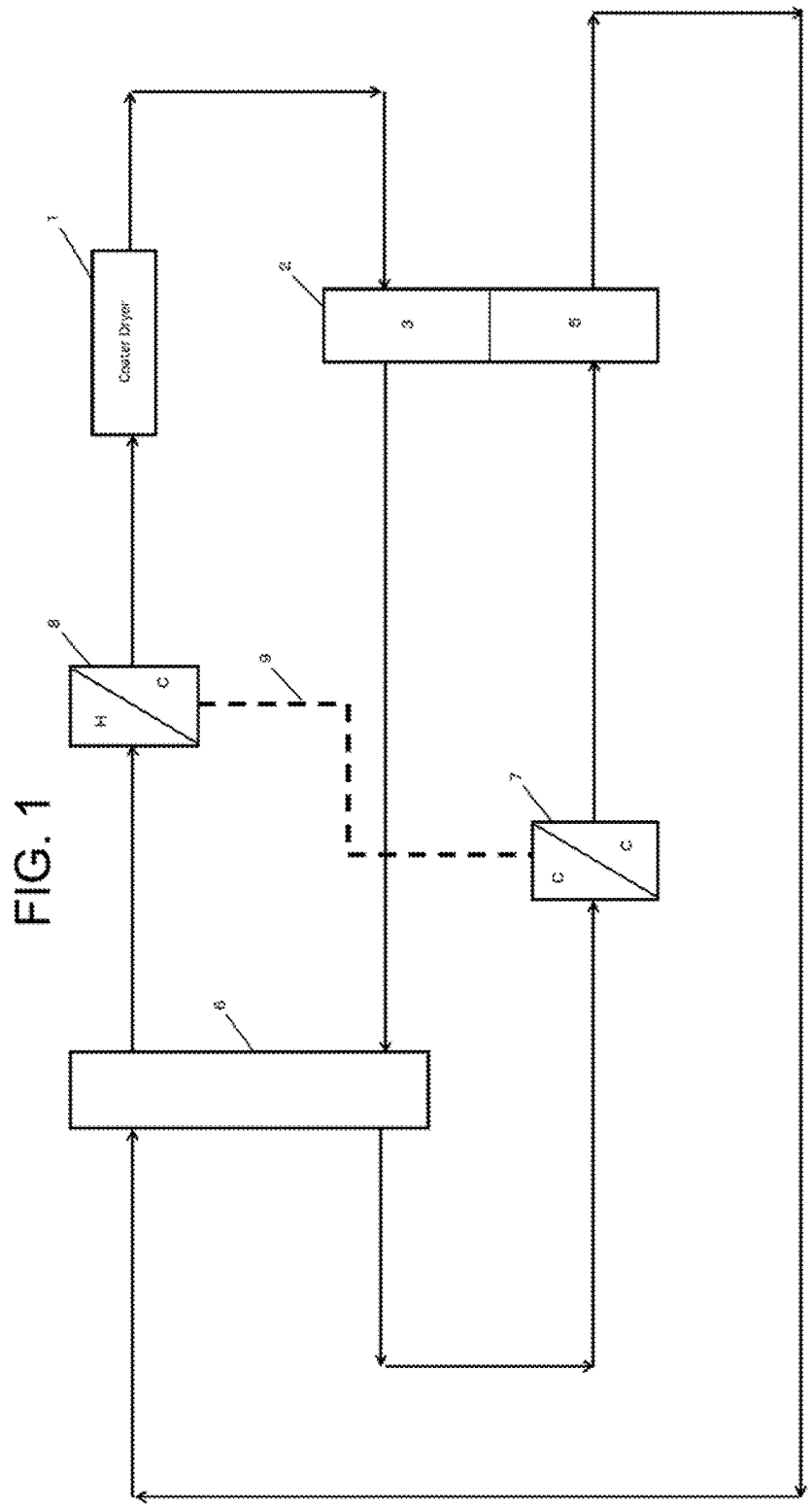
FIG. 1 shows a flow diagram of a first embodiment of the proposed coater drier.

Reference will now be made in detail to the embodiments, examples of which are illustrated in the accompanying drawings, wherein like reference numerals refer to the like elements throughout. The embodiments are described below to explain the proposed system by referring to the figures.

A slurry which contains an organic solvent is applied on both sides of a metallic foil as a current collection object in a process of providing an electrode of a rechargeable lithium-ion battery. The organic solvent in the slurry evaporates when the slurry is heated with a coater drier to be solidified. The proposed drying apparatus performs heat recovery from the exhaust air from this coater drier, and collects organic solvent that evaporated by a combination of cooling condensation and concentration recovery by an adsorption rotor. Since a heat pump is used for the cooling device which carries out cooling condensation of the organic solvent and the heating device which heats purification air as air supply of the coater drier, it becomes energy saving as the whole drier apparatus.

Embodiment 1

A first potential embodiment of the proposed drying apparatus is described along with a flow diagram of FIG. 1 as follows. The constitution includes a VOC concentration rotor 2, a sensible heat exchanger 6, a cooling device 7, and a heating device 8. The coater drier 1 in the drawings corresponds to a drying furnace which is comprised of a single stage or two or more stages and which dries both sides of the metallic foil as a current collection object, which is applied by a slurry containing the organic solvent, for example, in a process of electrode production of a rechargeable lithium-ion battery. It should be noted that a honeycomb rotor having a ceramic substrate which carries a VOC adsorbent such as zeolite and activated carbon can be used for the VOC concentration rotor 2. A honeycomb rotor which is made of metal such as aluminum and stainless steel, etc. or ceramic substrate and a honeycomb-orthogonal element of stationary type can be used for the sensible heat exchanger 6. Metal coils which are made of aluminum and stainless steel etc., can be used for the cooling device 7 and the heating device 8.

As shown in FIG. 1, exhaust air from coater drier 1 is sent to the desorption zone 3 of the VOC concentration rotor 2, where it desorbs VOCs adsorbed in the adsorption zone 5. The air which passes through the desorption zone 3 is sent to a cooling zone of the sensible heat exchanger 6 so that sensible heat exchange is performed on the air with low-temperature air which passed through the adsorption zone 5 of VOC concentration rotor 2, and the air is cooled. The air cooled by passing through the sensible heat exchanger 6 is sent to the cooling device 7 to carry out cooling condensation of VOCs, which VOCs are collected as an organic solvent of a fluid. The air which is passed through the cooling device 7 is sent to the adsorption zone 5 of VOC concentration rotor 2 so that VOCs which remain without being cooling condensed, are absorbed. The air which passes through the adsorption zone 5 of VOC concentration rotor 2 is sent to a heating zone of the sensible heat exchanger 6, where sensible heat exchange is performed on the air using the hot air which passed through the desorption zone 3 of VOC concentration rotor 2. This warms the air. The air which is warmed through the heating zone of sensible heat exchanger 6 is sent to the heating device 8 to be heated. Then, this even warmer air is reused as air supply for the coater drier 1. It should be noted that the heat pump circuit 9 connects the cooling device 7 with the heating device 8 at a cooling coil of the evaporator in a heat pump and a heating coil of the condenser in the heat pump. It should be also noted that, although chlorofluorocarbon alternatives etc. are commonly used as a refrigerant in heat pumps, this heat pump system may use carbon dioxide as the refrigerant. It is possible for the temperature of the air heated with heating device 8 to be 100° C. or more. In addition, since the carbon dioxide is a natural (safer) refrigerant, it can help mitigate global warming. Auxiliary heating devices such as an electric heater and or steamy heater may be installed on an outlet side of the heating device 8 if necessary. It will become energy saving if steam of from boiler, or high temperature exhaust heat from other equipment, etc. can be recycled and used for this auxiliary heating device.

The first embodiment has the above constitutions, and the details of a potential operation are described as below. The exhaust heat temperature from the coater drier 1 is set at about 100° C., the amount of winds (air velocity) is set at about 50-Nm3/min, and the NMP concentration is set at about 1000 ppm. The exhaust air is sent to the desorption zone 3 of the VOC concentration rotor 2. At the outlet of desorption zone 3, the temperature of gas reaches 80° C., NMP concentration is set to 1252 ppm. This exhaust gas is sent to the cooling zone of the sensible heat exchanger 6. At an outlet of the cooling zone of the sensible heat exchange 6, assuming a heat exchange efficiency of 75%, the temperature of the gas reaches 41° C. From here, the gas is sent to the cooling device 7. At the outlet of the cooling device 7, the temperature of the gas reaches 12° C. and the NMP concentration becomes 280 ppm by carrying out cooling condensation of the NMP, which are collected. From the cooling device 7, the gas is sent to the adsorption zone 5 of the VOC concentration rotor 2. At the outlet of the adsorption zone 5, the temperature of gas reaches 28° C. and since NMP is adsorbed in the adsorption zone 5 of the VOC concentration rotor 2, the NMP concentration becomes 28 ppm. Then this gas is sent to the heating zone of the sensible heat exchanger 6. At an outlet of the heating zone of the sensible heat exchanger 6, the temperature of gas reaches 67° C. and the gas is sent to the heating device 8. At the outlet of the heating device 8, the temperature of gas reaches 100° C. The gas is reused as air supply for the coater drier 1.

Embodiment 2

Figure 2:
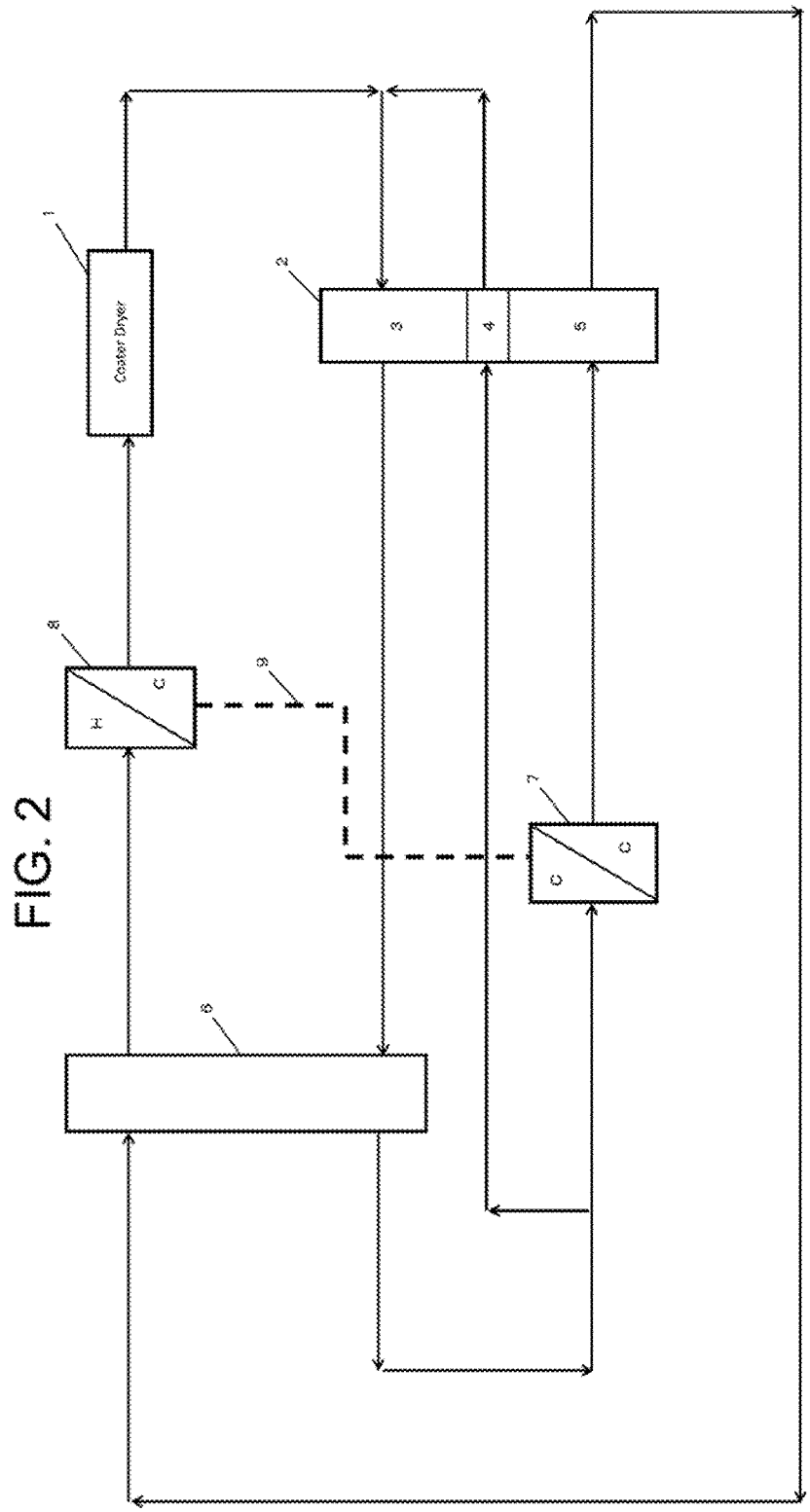
FIG. 2 shows a flow diagram of a second embodiment of the coater drier.

A second embodiment of the proposed drying apparatus is described along with the flow diagram of FIG. 2 as follows. Since the apparatus-constitutions of the drying apparatus of the second embodiment are the same as that of the first embodiment in FIG. 1, the overlapping explanation is omitted. Although the VOC concentration rotor 2 is divided into two portions, that is, the adsorption zone 5 and the desorption zone 3 in the first embodiment in FIG. 1, the VOC concentration rotor 2 of the second embodiment is provided newly with a purge zone 4, and, as a result, the rotor is divided into three portions in the second embodiment. A part of the gas from the cooling zone, before sending to the cooling device 7, which is 5-Nm3/min is sent to the purge zone 4 of the VOC concentration rotor 2. The gas which passes through the purge zone is mixed with the exhaust air from the coater drier 1, and sent to the desorption zone 3 of the VOC concentration rotor 2. At the outlet of the desorption zone 3, the temperature of gas reaches 80° C., the amount of winds (gas volumetric flow rate) becomes 55-Nm3/min, the NMP concentration reaches 1138 ppm, and the gas is sent to the cooling zone of the sensible heat exchanger 6. Although the gas that would otherwise be sent to the cooling device 7 is shown as the air for the purge zone 4, the second embodiment is not limited to this. The gas after passing through the cooling device 7 or the gas after passing through the adsorption zone 5 of the VOC concentration rotor 2 may be used. Also, open (external/fresh) air from outside of the drying apparatus may be used directly.

Embodiment 3

Figure 3:
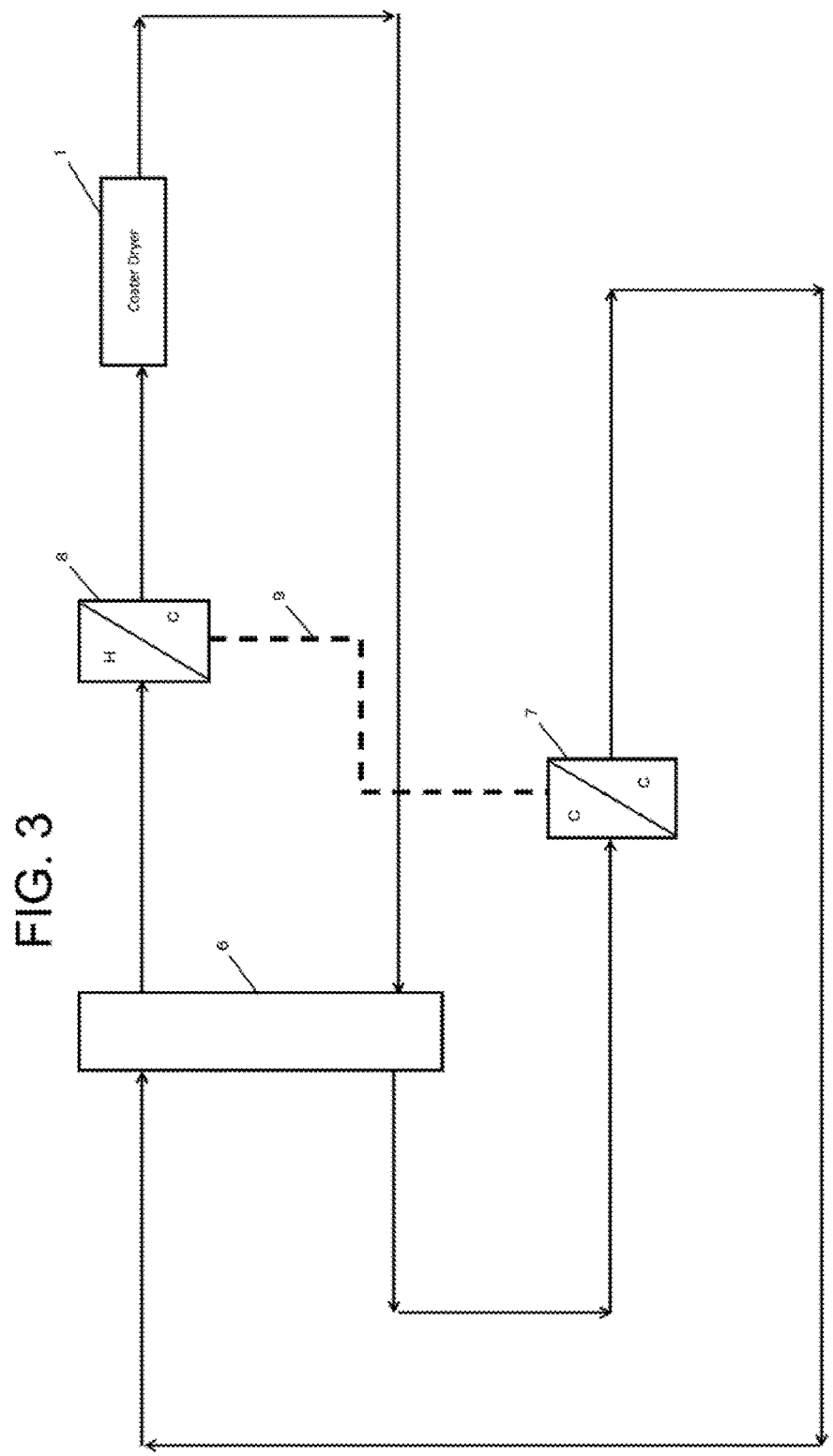
FIG. 3 shows a flow diagram of a third embodiment of the coater drier.

A third potential embodiment of the proposed drying apparatus is described along with the flow diagram of FIG. 3 as follows. The explanation which overlaps with embodiments 1 and 2 is omitted. In embodiments 1 and 2, although the VOC concentration of the exhaust air from the coater drier 1 is raised by using the VOC concentration rotor 2, in the third embodiment, the VOC concentration rotor 2 is not included in the drying apparatus. As well as the embodiments 1 and 2, we can assume an exhaust heat temperature from the coater drier 1 is set at 100° C., the amount of winds becomes 50-Nm3/min and the NMP concentration reaches 1000 ppm. The exhaust air is sent to the cooling zone of the sensible heat exchanger 6. After passing through the cooling zone of the sensible heat exchanger 6, the temperature of the gas reaches 34° C. if the heat exchange efficiency is 75%. Then, the gas is sent to the cooling device 7.

At the outlet of the cooling device 7, the temperature of gas reaches 12° C., and by carrying out cooling condensation of NMP and collecting NMP, the NMP concentration is reduced to 280 ppm. Then, the gas is sent to the heating zone of the sensible heat exchanger 6. At an outlet of the heating zone of the sensible heat exchanger 6, the temperature of the gas reaches 78° C. From here, the gas is sent to the heating device 8. At the outlet of the heating device 8, the temperature of the gas reaches 100° C. and the gas is reused as supply air for the coater drier 1. In this third embodiment, the NMP concentration of the air supply to be reused becomes higher, 280 ppm, and the numerical value is higher than embodiments 1 and 2. However, since the VOC concentration rotor 2 is not used, the device becomes more compact, and the initial cost is reduced. Since the energy to operate the VOC concentration rotor 2 becomes unnecessary, the operating running cost can also be reduced.

Embodiment 4

Figure 4:
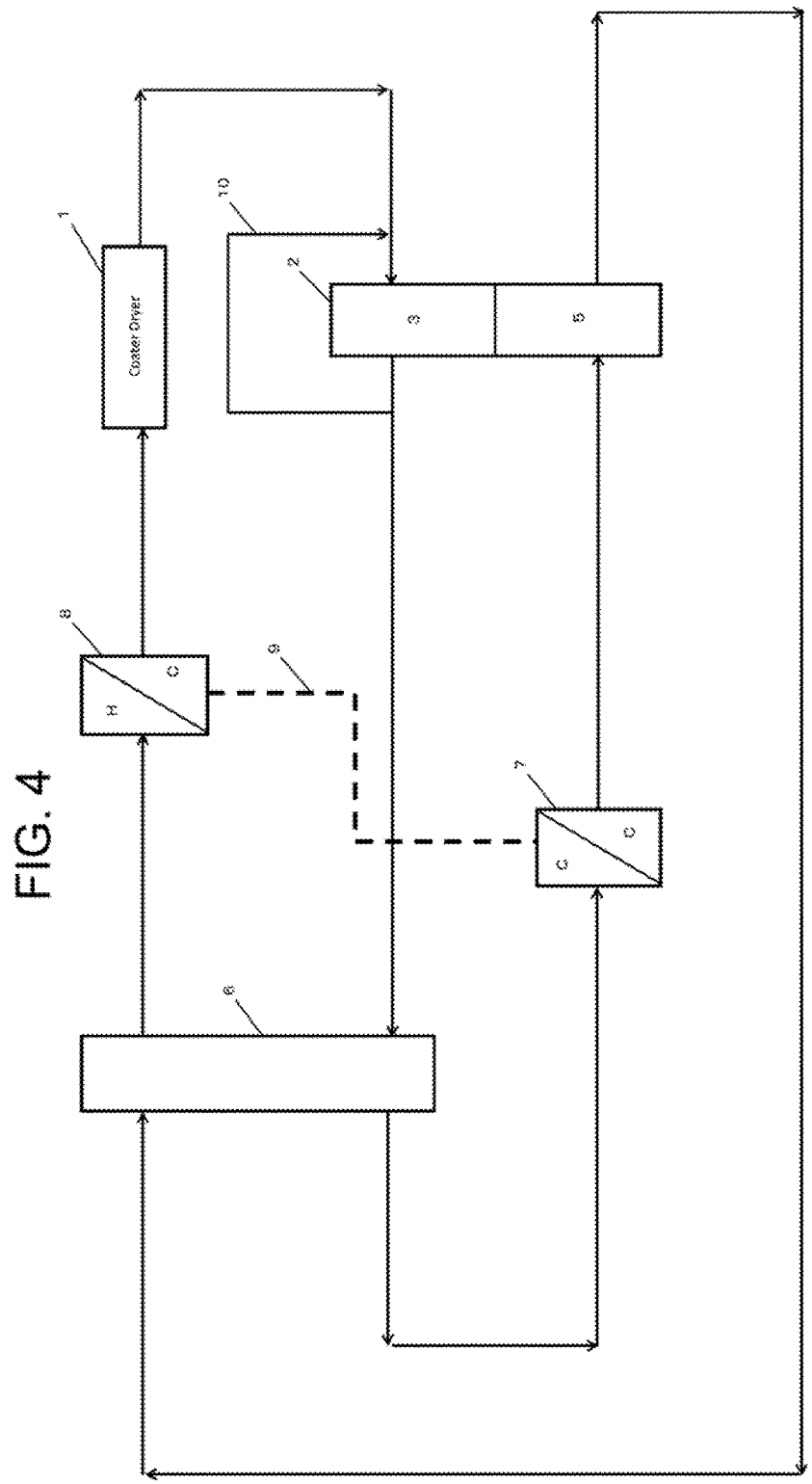
FIG. 4 shows a flow diagram of a fourth embodiment of the coater drier.

Next, the fourth potential embodiment of the proposed drying apparatus is described in the flow diagram of FIG. 4. Since the constitution of the drying apparatus are the same as that of the first embodiment of FIG. 1, the overlapping explanation is omitted. In the fourth embodiment, the drying apparatus is constituted so that a part of air which passed through the desorption zone 3 of the VOC concentration rotor 2 is branched and returned to the inlet side of the desorption zone 3 of the VOC concentration rotor 2 though a circulation way 10 mounted from the inlet side to the outlet side of the desorption zone 3. This can be useful in a case where the performance of VOC concentration rotor 2 falls due to a reduced exhaust gas temperature from the coater drier 1. By re-circulating a part of the air which passed through desorption zone 3, the volumetric flow rate into the desorption zone 3 is increased to exceed the quantity of the exhaust air from the coater drier 1. This improves the recovery performance of the VOC concentration rotor 2. The amount of winds which passes through the circulation way 10 is suitably adjusted by the fan (not shown) mounted in the circulation way or a damper (not shown) etc. which is mounted in the aeration way. Although the heat pump is used for the cooling device 7 and the heating device 8 in embodiments 1 through 4, when neither heat pump equipment nor piping can be installed because of problems with the installation space, or when there is a heat source for cooling or heating from other equipment etc., the drying apparatus can be formed without using the heat pump.

The proposed system may provide an apparatus which collects organic solvents from exhaust air from a drying process such as a drying process used in manufacturing electrode boards used for a rechargeable lithium-ion battery or a drying process used in manufacturing a magnetic recording medium. The proposed system may provide an apparatus which can reduce the initial cost and the running cost.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A drying apparatus comprising:
at least one dryer stage which dries objects to be dried, each dryer stage including at least one dryer, the objects containing an organic solvent;
a volatile organic compound (VOC) concentration rotor having a desorption zone and an absorption zone;
a sensible heat exchanger having a cooling zone and a heating zone;
a cooler which cools air;
a heater; and
a condensation recovery section which condenses air and carries out recovery of organic solvent, wherein
exhaust air from the at least one dryer stage is sent to the desorption zone,
air that passed through the desorption zone is sent to the cooling zone,
air that passed through the cooling zone is sent to and cooled by the cooler where condensation and recovery of organic solvent in the air that passed through the cooling zone are carried out,
air that passed through the cooler is sent to the absorption zone to absorb organic solvent and carry out recovery of organic solvent,
purified air that passed through the absorption zone is sent to the heating zone,
air that passed through the heating zone is sent to the heater,
air that passed through the heater is sent to the at least one dryer stage, and
the VOC concentration rotor and the cooler serve as the condensation recovery section which condenses air and carries out recovery of organic solvent.

2. The drying apparatus according to claim 1, wherein a part of the air that passed through the desorption zone is branched and returns to an inlet of the desorption zone.

3. The drying apparatus according to claim 1, wherein a heat pump circuit is provided to serve as the cooler and the heater.

4. The drying apparatus according to claim 3, wherein carbon dioxide is used for a refrigerant of the heat pump circuit.

5. The drying apparatus according to claim 1, wherein
the VOC concentration rotor has a purge zone in addition to the desorption zone and the absorption zone,
a part of air to be passed through the cooler is sent to the purge zone, and
air that passed through the purge zone is mixed with the exhaust air from the at least one dryer stage.

6. The drying apparatus according to claim 1, wherein
the VOC concentration rotor has a purge zone in addition to the desorption zone and the absorption zone,
a part of the air that passed through the cooling zone is sent to the purge zone, and
air that passed through the purge zone is mixed with the exhaust air from the at least one dryer stage.

7. The drying apparatus according to claim 1, wherein
the VOC concentration rotor has a purge zone in addition to the desorption zone and the absorption zone,
a part of the purified air that passed through the absorption zone is sent to the purge zone, and
air that passed through the purge zone is mixed with the exhaust air from the at least one dryer stage.

8. The drying apparatus according to claim 1, wherein
the VOC concentration rotor has a purge zone in addition to the desorption zone and the absorption zone,
open air is sent to the purge zone, and
air that passed through the purge zone is mixed with the exhaust air from the at least one dryer stage.

9. The drying apparatus according to claim 2, wherein a heat pump circuit is provided to serve as the cooler and the heater.

10. The drying apparatus according to claim 9, wherein carbon dioxide is used for a refrigerant of the heat pump circuit.

11. The drying apparatus according to claim 10, wherein
the VOC concentration rotor has a purge zone in addition to the desorption zone and the absorption zone,
a part of the air that passed through the cooling zone is sent to the purge zone, and
air that passed through the purge zone is mixed with the exhaust air from the at least one dryer stage.

12. The drying apparatus according to claim 10, wherein
the VOC concentration rotor has a purge zone in addition to the desorption zone and the absorption zone,
a part of the purified air that passed through the absorption zone is sent to the purge zone, and
air that passed through the purge zone is mixed with the exhaust air from the at least one dryer stage.

13. The drying apparatus according to claim 10, wherein
the VOC concentration rotor has a purge zone in addition to the desorption zone and the absorption zone,
open air is sent to the purge zone, and
air that passed through the purge zone is mixed with the exhaust air from the at least one dryer stage.

14. A drying apparatus comprising:
at least one dryer stage which dries objects to be dried, each dryer stage including at least one dryer, the objects containing an organic solvent;
a sensible heat exchanger having a cooling zone and a heating zone;
a cooler which cools air;
a heater; and
a condensation recovery section which condenses air and carries out recovery of organic solvent, wherein
exhaust air from the at least one dryer stage is sent to the cooling zone,
air that passed through the cooling zone is sent to and cooled by the cooler where condensation and recovery of organic solvent in the air that passed through the cooling zone are carried out,
air that passed through the cooler is sent to the heating zone,
air that passed through the heating zone is sent to the heater,
air that passed through the heater is sent to the at least one dryer stage, and
the cooler serves as the condensation recovery section which condenses air and carries out recovery of organic solvent.

15. The drying apparatus according to claim 14, wherein a heat pump circuit is provided to serve as the cooler and the heater.

16. The drying apparatus according to claim 15, wherein carbon dioxide is used for a refrigerant of the heat pump circuit.

* * * * *